United States Patent
Patel et al.

Patent Number: 6,143,394
Date of Patent: Nov. 7, 2000

[54] NONWOVEN SORBENT MANHOLE APRON

[75] Inventors: Kirit H. Patel, Bensalem, Pa.; Gulshan Chhabra, Roselle, N.J.

[73] Assignee: KG Fibers, Inc., Palmyra, N.J.

[21] Appl. No.: 09/237,614

[22] Filed: Jan. 25, 1999

Related U.S. Application Data

[60] Provisional application No. 60/097,729, Aug. 18, 1998, abandoned.

[51] Int. Cl.⁷ .................................. B32B 3/10; B32B 3/00
[52] U.S. Cl. .......................... 428/131; 428/137; 428/219; 428/220; 428/405; 428/911; 442/79; 442/80; 442/85; 442/86; 442/91; 442/93; 442/121; 442/122; 442/395; 52/19; 52/20; 404/25
[58] Field of Search ..................... 428/911, 405, 428/220, 219, 131, 137; 442/79, 80, 85, 86, 91, 93, 121, 122, 395; 52/19, 20; 404/25; 454/48, 49; 405/38

[56] References Cited

U.S. PATENT DOCUMENTS

| | | |
|---|---|---|
| 1,641,029 | 8/1927 | Gaudet . |
| 2,825,070 | 3/1958 | Alexander et al. . |
| 3,413,180 | 11/1968 | Smith . |
| 3,524,203 | 8/1970 | Ruggles . |
| 3,938,285 | 2/1976 | Gilbu ........................................... 52/20 |
| 4,125,656 | 11/1978 | Creamer ................................... 4/251.1 |
| 4,207,282 | 6/1980 | Grisch ..................................... 264/257 |
| 4,285,075 | 8/1981 | Nelson ..................................... 4/251.1 |
| 4,650,481 | 3/1987 | O'Connor et al. ..................... 604/380 |
| 4,813,944 | 3/1989 | Haney et al. ............................ 604/358 |
| 4,936,706 | 6/1990 | Luftenegger et al. .................. 405/128 |
| 5,028,468 | 7/1991 | Taylor ....................................... 428/71 |
| 5,067,185 | 11/1991 | Kohler ....................................... 4/661 |
| 5,201,151 | 4/1993 | LeBlanc et al. ........................... 52/20 |
| 5,221,568 | 6/1993 | Heerten et al. ......................... 428/213 |
| 5,268,106 | 12/1993 | Allen et al. ............................. 210/680 |
| 5,401,552 | 3/1995 | Bohrer et al. . |
| 5,403,491 | 4/1995 | Holland .................................. 210/680 |
| 5,527,458 | 6/1996 | Gehrmann et al. . |
| 5,736,077 | 4/1998 | Kamiyama et al. ..................... 264/32 |
| 5,816,305 | 10/1998 | May ........................................ 150/165 |
| 5,855,999 | 1/1999 | McCormack ........................... 428/516 |
| 5,882,453 | 3/1999 | Stark ......................................... 156/70 |
| 5,886,306 | 3/1999 | Patel et al. ............................. 181/290 |
| 5,911,246 | 6/1999 | Kittson et al. ........................... 138/98 |
| 5,911,537 | 6/1999 | Pulver ....................................... 404/25 |

Primary Examiner—Blaine Copenheaver
Assistant Examiner—Arti Singh
Attorney, Agent, or Firm—Lucas & Just

[57] ABSTRACT

There is disclosed the manufacture and use of nonwoven absorbent mats laminated with barrier film for manhole aprons. The absorbent aprons are used about manholes during routine maintenance of underground transformers, utility cables, etc. The nonwoven aprons are coated to prevent the absorbed liquid from leaching through. The mat is specially designed to absorb contaminated liquid very quickly. The nonwoven mat is made out of cotton shoddy fibers and/or a mixture of synthetic fibers and/or synthetic fibers only with film on one side. The mat has a 36-inch manhole opening in the center thereof. The mat is thin and lays flat to conform to the road. The thickness of the mat ranges from 0.075" to 0.25" in order to avoid any tripping hazard.

11 Claims, 4 Drawing Sheets

NONWOVEN SORBENT MANHOLE APRON

RELATED APPLICATIONS

This application claims the priority of provisional patent application S/R# 60/097,729 filed Aug. 18, 1998, now abandoned.

FIELD OF THE INVENTION

The present invention relates to sorbent products, and, in particular, to sorbent products used to prevent environmental contamination by workers exiting from manholes in the street.

BACKGROUND OF THE INVENTION

In today's world, oil and PCB pollution is one of the greatest environmental concerns of mankind. There are few, if any, who have not heard about the gigantic oil spill caused by the EXXON Valdez running aground in Alaska. Although this was a gargantuan and well-known oil spill, there are lesser oil spills and contaminations which pollute waterways, land areas, city streets, and industrial and commercial facilities on a daily basis.

For example, utility companies maintain the underground transformers and electrical wires in big cities. During routine maintenance, a person wearing protective clothing goes underground and, when he comes out from the manhole opening, his clothes are contaminated with oil and PCB's. When it rains, the contaminated water runs down the street and eventually into water drains on the street. There is also a safety issue for a passing pedestrian having wet feet on the street as well as a slipping hazard for the maintenance person.

Sorbent products are very well known in the art. They come in many different shapes and sizes and have varying applications. There are generally two types of sorbent products, i.e. those that absorb and those that adsorb.

Referring first to the absorbent products, these are generally composed of natural fibers, notably cellulose fibers, cotton fibers, fabric waste, etc. The prime advantages of natural fiber products are low cost, good absorption and capacity, and biodegradability. These fibers will also absorb contaminated water as compared to synthetic fibers which normally repel water.

The adsorbent materials are generally used in two different forms. One form is an extruded nonwoven microfiber blanket. The blanket can be cut to various sizes and used "as is." The other form is loose fiber bundles. These loose fibers can be stuffed into mesh tubes, referred to in the industry as "socks," to form barrier booms. While adsorbent products are very good at separating oil from water, their prime disadvantage is high cost.

SUMMARY OF THE INVENTION

The applicants have discovered that there is a need for specialty applications for manhole aprons to protect the environment from water contaminated with oil and PCB's. It has been found that a web of cellulose fibers in combination with synthetic fibers provides excellent absorption properties for manhole aprons. The web consists of all cellulose fibers for some applications with a polyethylene film as a barrier material. The similar prior art for chemical drum transportation is given in U.S. Pat. No. 5,352,497. The prior art uses heavy drum pads compared to the thin nonwoven mat of the present invention used for manhole aprons.

DETAILED DESCRIPTION OF THE INVENTION

Figure 1:
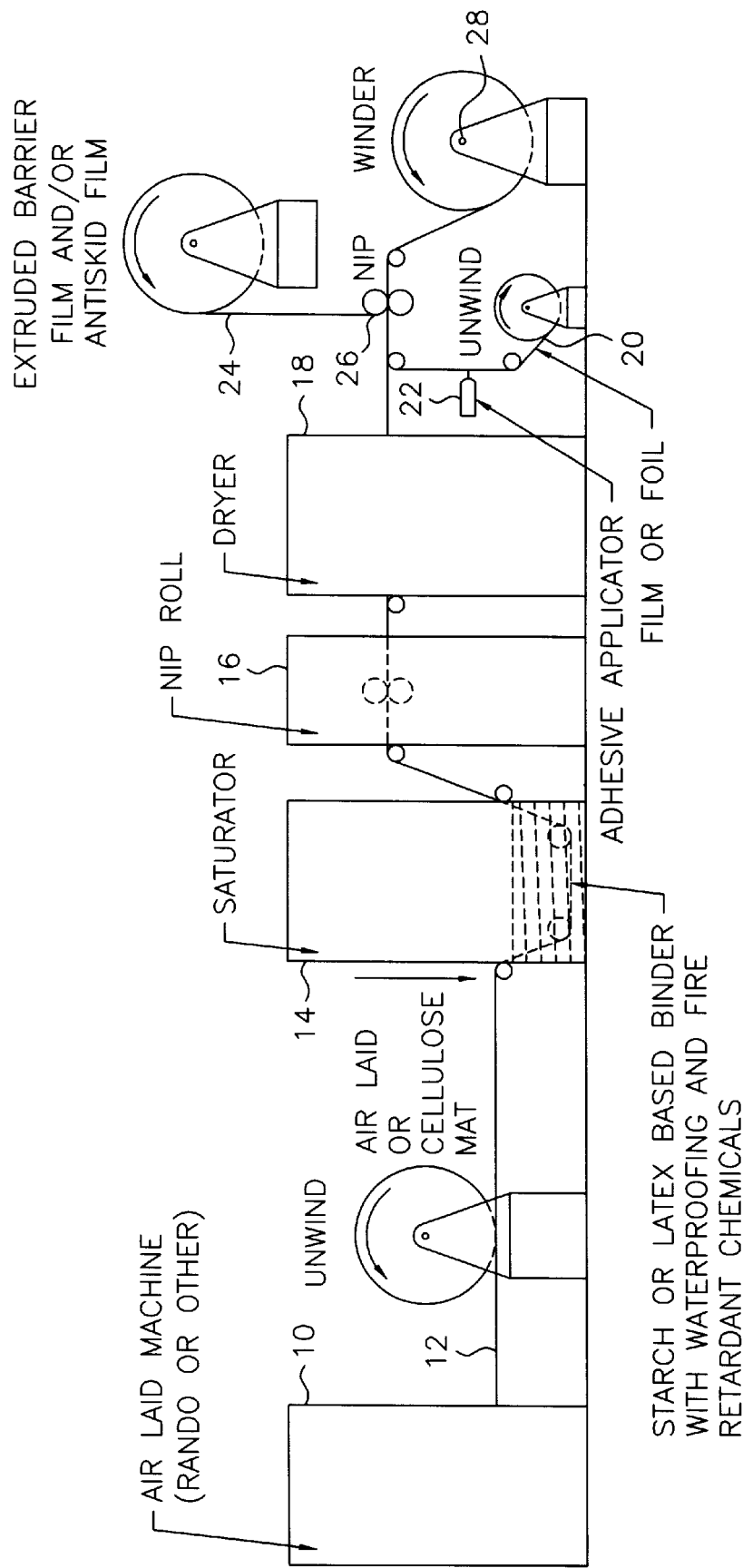
FIG. 1 shows a process for making the mats of the present invention.
Figure 2:
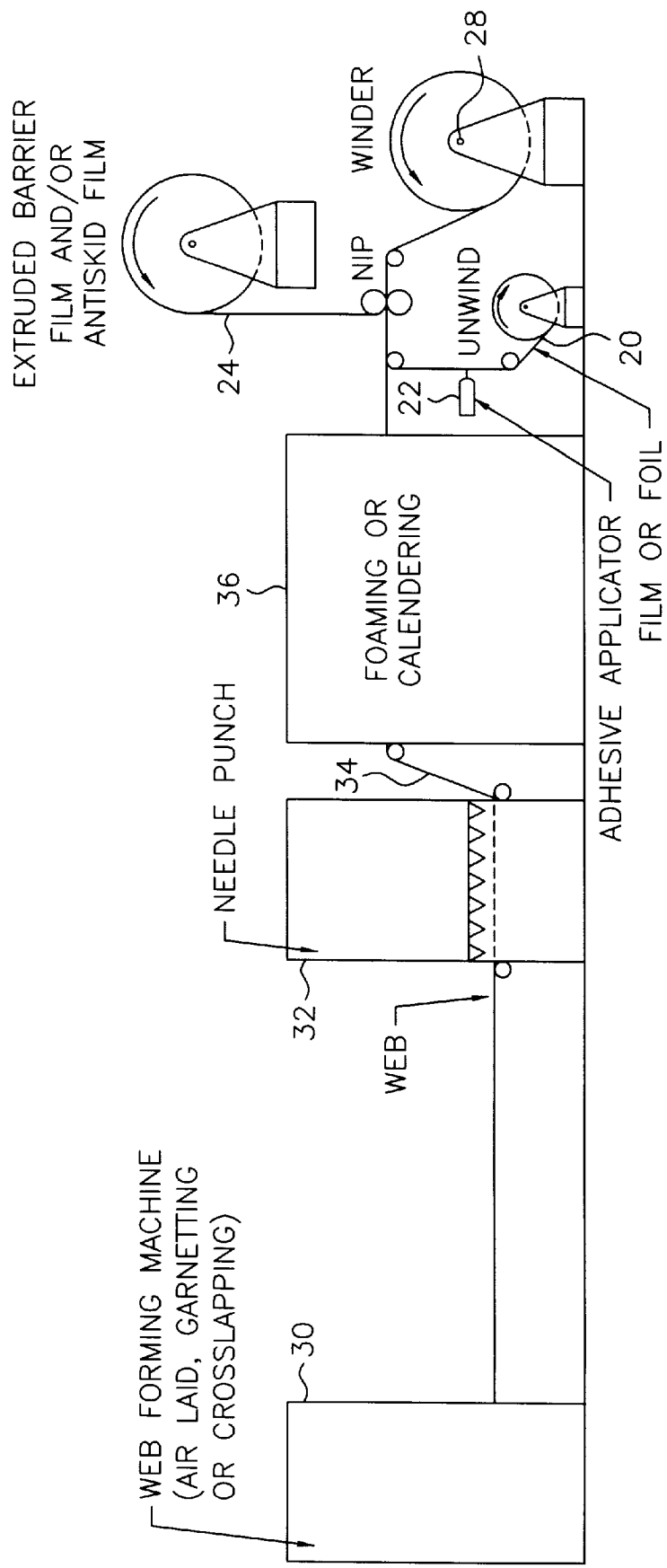
FIG. 2 shows an alternate process for making the mats of the present invention.

A typical process of making the mat of the present invention is shown in FIG. 1 and is also described in U.S. Pat. No. 5,886,306. The mat can also be made using cotton shoddy fibers with long synthetic fibers by a garnetting, cross lapping and needling process as shown in FIG. 2. The mat can then be laminated with barrier film and/or anti-skid film on one side.

The cotton shoddy fibers (70–80% cotton and balance 30–20% synthetic) are received in bale form, mainly recycled denim fibers. As shown in FIG. 1, the fibers are fed into a Rando-type air-lay machine 10 to form a blanket 12. The unbonded fiber blanket 12 then goes through a typical saturator 14 where a synthetic latex such as PVA (polyvinyl acetate), metal salts (e.g. monoammonium phosphate) as a fire retardant and a non-ionic surfactant are applied, along with a wetting agent. The binders used can be starch or latex depending on the rate of absorption required. The wet bonded mat goes through nip rolls 16 and then goes through a dryer 18. The dried mat is laminated with the film on one or both surfaces. A barrier film 20 can be applied to the bottom with adhesive 22 and an anti-skid film 24 can be applied on top of the barrier film as a second layer. The anti-skid film is designed to keep the manhole apron in place. The mat then goes through nip rolls 26 before being wound on a spool 28.

In a second process, as shown in FIG. 2, the mat is formed using garnetting and cross lapping in unit 30 before it goes through the needle punch 32. The needled mat 34 then can be calendered in unit 36 before application of laminations as with the process of FIG. 1.

Figure 3:
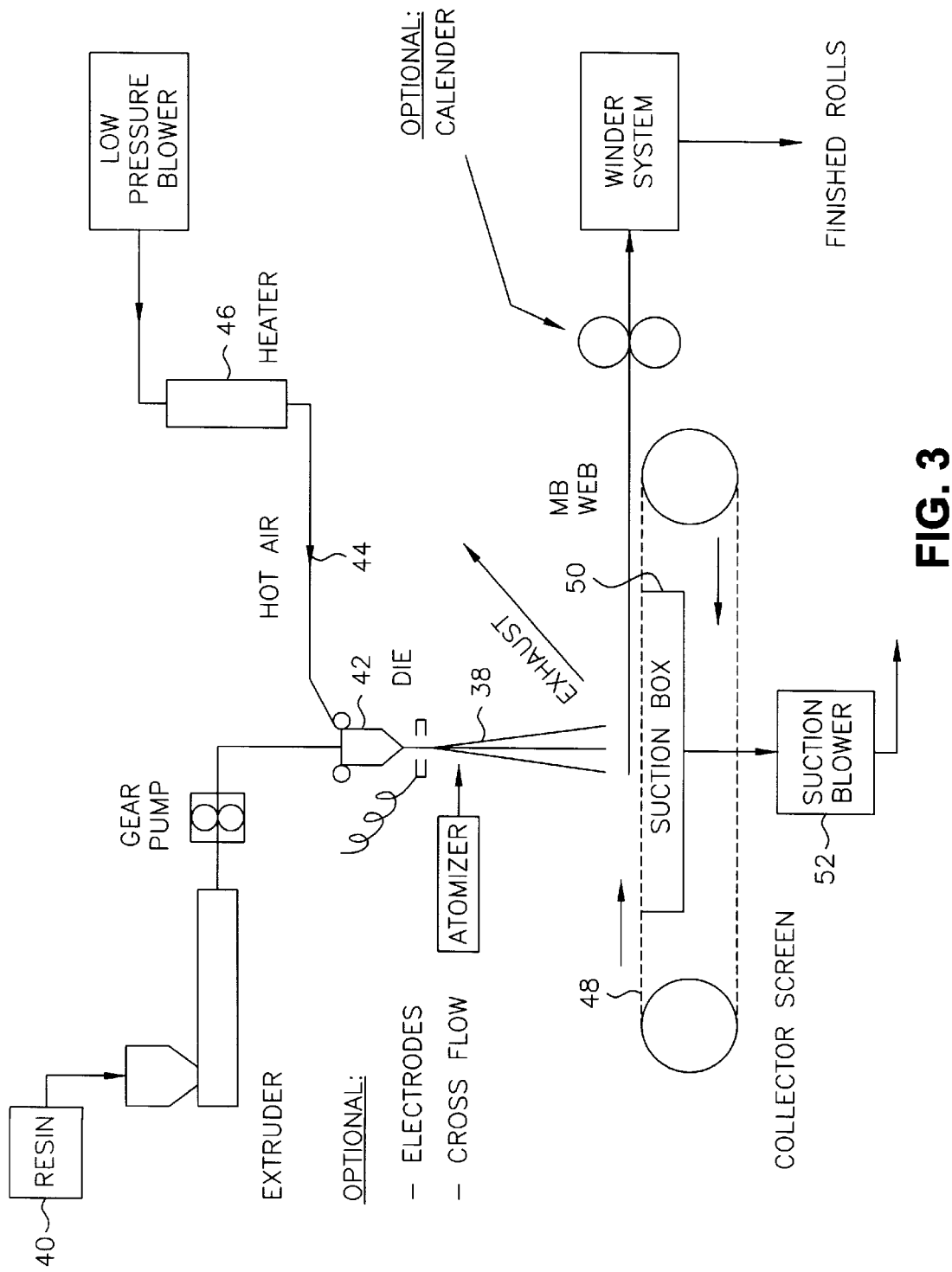
FIG. 3 shows yet another process for making the mats of the present invention.

In a third process, as shown in FIG. 3, the mat is made using melt-blown technology. Microfibers 38 are made by extruding polymer 40 through a small hole 42 which is then drawn into a short fiber length using a very high velocity hot air flow 44 supplied by a heater 46. The random microfibers are collected on a porous polyester moving belt 48 rotating on a suction box 50 with a suction blower 52 therebeneath. The mat does not have much strength, but can be bonded or laminated with different facings for additional strength as shown in FIG. 1.

Figure 4:
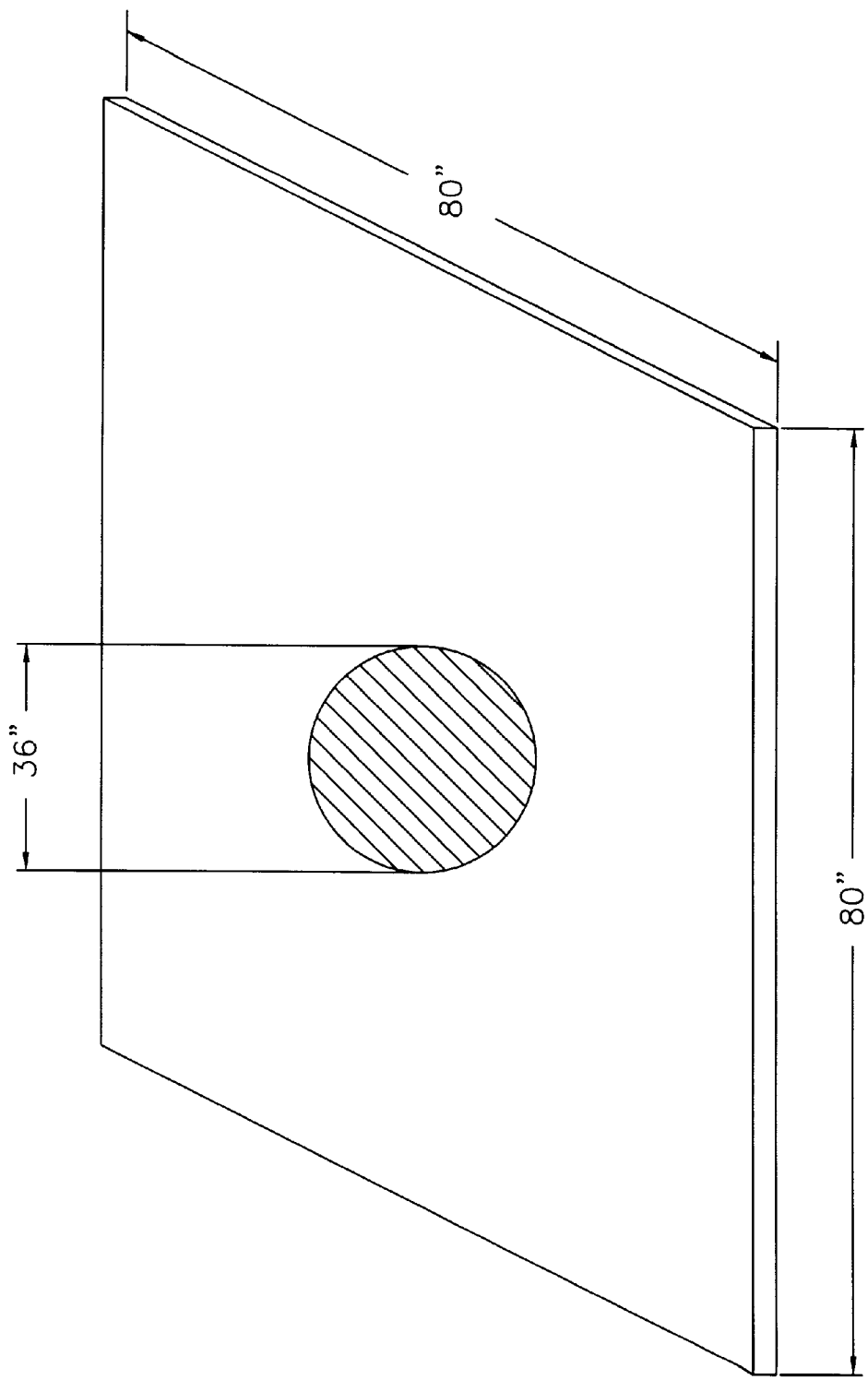
FIG. 4 shows a mat suitable for use as a manhole apron to prevent environmental contamination.

The nonwoven mat laminated with barrier film of the present invention as a manhole apron is shown in FIG. 4. A typical mat consists of air-laid 100% cotton shoddy fibers saturation bonded with water-based latex. The mat is then laminated with polyethylene film using adhesive, or a film can be extruded onto the finished mat in a secondary off-line operation. The mat can further be laminated with a non-skid surface on top of a chemical barrier film. The one-piece apron with an opening for a manhole in the center avoids extra labor to lay plastic and the sorbent separately on the road. The ease of use and time used to lay the mat will minimize road blockage during repair.

The typical size of the manhole apron is 80"×80" with a 36-inch circle cut out in the center of the piece for the manhole entry. The typical mat weight will be 9–12 oz/sq.yd. The thickness of the mat may be from 0.075" to 0.25".

What is claimed is:

1. The manhole having a manhole surrounding apron, said manhole having an opening through which a person can go into and come out of said manhole, said apron surrounding said opening in said manhole and being effective to aid in protecting the environment from contaminated water brought through said manhole opening by a person who has come out of the said manhole, said apron being a flat nonwoven absorbent mat of fibers having a first face and a second, opposed face and having a hole within the confines of said mat, said hole being substantially the size of the manhole to be surrounded and being large enough to permit a person to pass therethrough, a barrier film or foil being laminated to the first said face and an anti-skid film being applied to said barrier film or foil on the first said face.

2. The manhole having a manhole surrounding apron of claim 1 wherein a barrier film or foil is also laminated to the second said face.

3. The manhole surrounding mat of claim 1 wherein the mat is made by an air-lay process.

4. The manhole surrounding apron of claim 1 wherein the mat is made by garnetting, cross lapping and needle punching.

5. The manhole surrounding apron of claim 1 wherein the mat is made by a melt-blow process.

6. The manhole surrounding apron of claim 1 wherein the fibers are cotton shoddy fibers comprising 70–80% cotton fibers and 30–20% synthetic fibers.

7. The manhole having a manhole surrounding apron of claim 1 wherein said apron is approximately 80 inches×80 inches.

8. The manhole having a manhole surrounding apron of claim 1 or 7 wherein said hole is approximately 36 inches in diameter and is centrally located in said apron.

9. The manhole having a manhole surrounding apron of claim 1 or 7 wherein said mat has a thickness of 0.075 inches to 0.25 inches.

10. The manhole having a manhole surrounding apron of claim 1 or 7 wherein said mat has a weight of 9 to 12 oz. per square yard.

11. The manhole having a manhole surrounding apron of claim 1 wherein said barrier film is composed of a material selected from the group consisting of polyethylene and polypropylene.

* * * * *

UNITED STATES PATENT AND TRADEMARK OFFICE
CERTIFICATE OF CORRECTION

PATENT NO : 6,143,394
DATED : November 7, 2000
INVENTOR(S): Kirit Patel et al.

It is certified that error appears in the above-identified patent and that said Letters Patent is hereby corrected as shown below:

Column 3, line 5 (claim 1), change "The manhole having a" to --A--; line 19 (claim 2), delete "having a manhole".

Column 4, line 6 (claim 7), delete "having a manhole"; line 10 (claim 8), delete "having a manhole"; line 13 (claim 9), delete "having a manhole"; line 16 (claim 10), delete "having a manhole"; line 20 (claim 11), delete "having a manhole".

Signed and Sealed this

Twenty-ninth Day of May, 2001

Attest:

NICHOLAS P. GODICI

Attesting Officer

Acting Director of the United States Patent and Trademark Office